G. GODDU.
MECHANISM FOR TRANSMITTING ROTARY MOTION.
APPLICATION FILED MAR. 23, 1914.

1,162,233.

Patented Nov. 30, 1915.

Witnesses
Frederick S. Greenleaf.
H. D. McPhail

Inventor
George Goddu
by Phillips Van Everen & Fish
Attys

UNITED STATES PATENT OFFICE.

GEORGE GODDU, OF WINCHESTER, MASSACHUSETTS, ASSIGNOR TO UNITED SHOE MACHINERY COMPANY, OF PATERSON, NEW JERSEY, A CORPORATION OF NEW JERSEY.

MECHANISM FOR TRANSMITTING ROTARY MOTION.

1,162,233.   Specification of Letters Patent.   Patented Nov. 30, 1915.

Application filed March 23, 1914. Serial No. 826,656.

*To all whom it may concern:*

Be it known that I, GEORGE GODDU, a citizen of the United States, residing at Winchester, in the county of Middlesex and Commonwealth of Massachusetts, have invented certain new and useful Improvements in Mechanism for Transmitting Rotary Motion; and I do hereby declare the following to be a full, clear, and exact description of the invention, such as will enable others skilled in the art to which it appertains to make and use the same.

The invention relates to mechanism for transmitting rotary motion, and as shown is embodied in a construction illustrated and described in applicant's co-pending application Serial No. 271,426, filed July 27, 1905, of which the present application is a division.

The object of the invention is to provide novel and improved mechanism by which a driving member, rotating at a uniform or substantially uniform speed in one direction, may transmit to a driven member a rotary motion having variable speeds, or intermittent pauses or reversals.

To this end the invention includes a rotary driving member which may be driven at a uniform rate of speed by any suitable mechanism, a driven member rotatable about an axis preferably coincident with or adjacent to the axis of the driving member, and cam controlled connections between the driving and driven members. The cam is preferably stationary, and the connections preferably include jointed links or arms, the angular relation of which may be changed by the cam as the links are carried around by the driving member to vary the speed or direction of rotation of the driven member.

The invention will be readily understood from an inspection of the accompanying drawings and the following detailed description of the mechanism illustrated therein.

Figure 1:
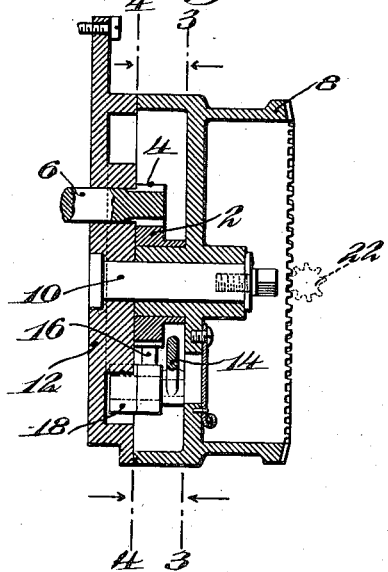
Figure 2:
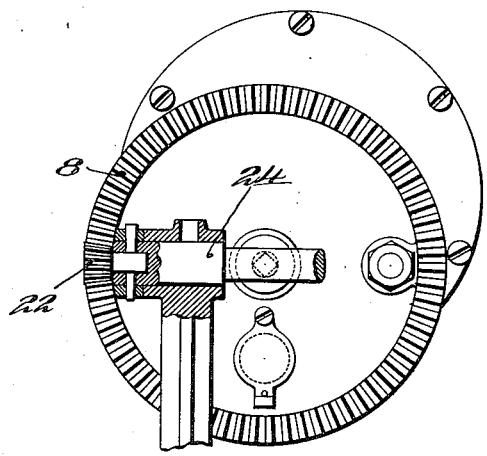
Figure 3:
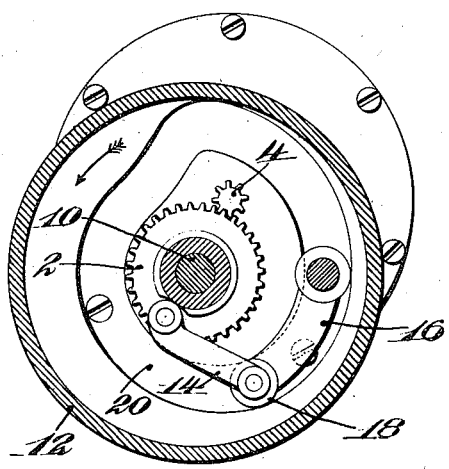
Figure 4:
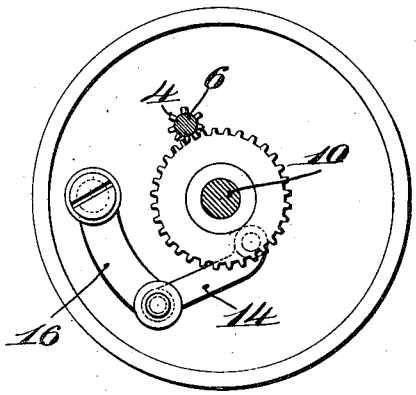

In the drawings, Figure 1 is a longitudinal sectional view showing the preferred form of the invention; Fig. 2 is an elevation looking toward the left in Fig. 1; Fig. 3 is a sectional view on line 3—3, Fig. 1; and Fig. 4 is a sectional view on line 4—4, Fig. 1.

In the construction shown in the drawings the driven member consists of a gear 2 meshing with a pinion 4 on a shaft 6 and mounted to rotate loosely on the hub of the driving member 8. The driving member is substantially cylindrical in shape, and is provided with a central web connecting the periphery to the hub which is mounted to rotate upon a stud 10 secured in the supporting plate 12. The connections between the driving member 8 and the driven member 2 consist of two links or arms 14 and 16 pivotally connected together and pivotally connected respectively to the driven and driving members. At the point where the links 14 and 16 are pivotally connected, a cam roll 18 is provided which engages a cam groove 20 formed in the fixed plate 12. The outer or rear edge of the periphery of the driving member 8 is provided with teeth engaged by a pinion 22 secured to a driving shaft 24.

By this construction, as the driving member 8 rotates in the direction of the arrow, Fig. 3, the driven member 2 will be carried around by means of the connection through the links or arms 14 and 16 at the same speed and in the same direction so long as the cam groove 20 is concentric with the axis of the driving and driven members, but any variation from concentricity in the cam groove will temporarily through the same connections either reverse the direction of rotation of the driven member, or arrest its movement, or vary its speed of rotation, according to the shape of the cam, so that while the driven member has the same mesne speed of rotation, and in the same direction as the driving member, its speed of movement will be varied, arrested, or its motion reversed by the action of the cam on the connection. In the construction shown the cam is shaped to intermittently reverse the driven member. During the greater portion of the revolution of the driving member the cam roll 18 is traveling up a gradual rise of the cam groove, and during a small portion of the revolution of the driving member the cam roll is traveling down the steep drop of the cam groove.

While the cam roll is traveling up the gradual rise of the cam groove, the driven member 2 is given a forward rotation which is faster than the forward rotation of the driving member. When, however, the cam roll passes down the abrupt drop of the cam groove, a rapid backward rotation relative to that of the driving member is imparted to the driven member, which backward motion is sufficiently rapid to reverse the direction of rotation of the driven member and the shaft 6. By connecting the shaft 6 with the driven member through the small pinion 4, a plurality of rotations in one direction may be imparted to the shaft 6, and then a partial reverse rotation during each rotation of the driving member.

While it is preferred to employ the specific construction shown and described, it will be understood that this construction is not essential to the broader features of the invention, and may be varied or modified without departing therefrom.

Having explained the nature and object of the invention, and specifically described one form of machine in which it may be embodied, what is claimed is:—

1. A mechanism for transmitting rotary motion, having, in combination, a rotary driving member, a rotary driven member, a plurality of arms connecting said members, and a cam acting on one of said arms to vary the motion transmitted to the driven member.

2. A mechanism for transmitting rotary motion, having, in combination, a rotary driving member, a rotary driven member, a jointed connection between the driving and driven members, and means for varying the angle of the jointed connection to vary the speed of rotation of the driven member.

3. A mechanism for transmitting rotary motion, having, in combination, a rotary driving member, a rotary driven member, connections between said members, and a stationary cam acting on said connections to vary the motion transmitted to the driven member.

4. A mechanism for transmitting rotary motion, having, in combination, a rotary driving member, a rotary driven member, a link connection between the members, and a stationary cam acting on the link connection to vary the speed of rotation of the driven member.

5. A mechanism for transmitting rotary motion, having, in combination, a rotary driving member, a concentric rotary driven member, connections between the members, and a stationary cam acting on the connections to vary the motion transmitted to the driven member.

6. A mechanism for transmitting rotary motion, having, in combination, a rotary driving member, a rotary driven member, a link connected to the driving member, a stationary cam acting on the link, and a connection between the link and driven member for varying the motion transmitted to the driven member.

7. A mechanism for transmitting rotary motion, having, in combination, a rotary driving member, a stationary cam, a link connected at one end to the driving member and carrying a roll arranged to engage the cam, a rotary driven member, and a second link connected to the driven member and to the first link.

8. A mechanism for transmitting rotary motion, having in combination, a rotary driving member, a rotary driven member, an arm connected to the driving member, a second arm connected to the first named arm and to the driven member, a cam, and a roll on one of said arms engaging the cam.

9. A mechanism for transmitting rotary motion, having in combination, a rotary driving member, a rotary driven member, an arm pivotally connected at one end to the driving member, a second arm connected at one end to the driven member, means connecting the free ends of said arms permitting relative movement thereof, and means for causing such relative movement while the driving member is in motion.

GEORGE GODDU.

Witnesses:
CHESTER E. ROGERS,
ABBIE L. FREAR.